Figure 1:
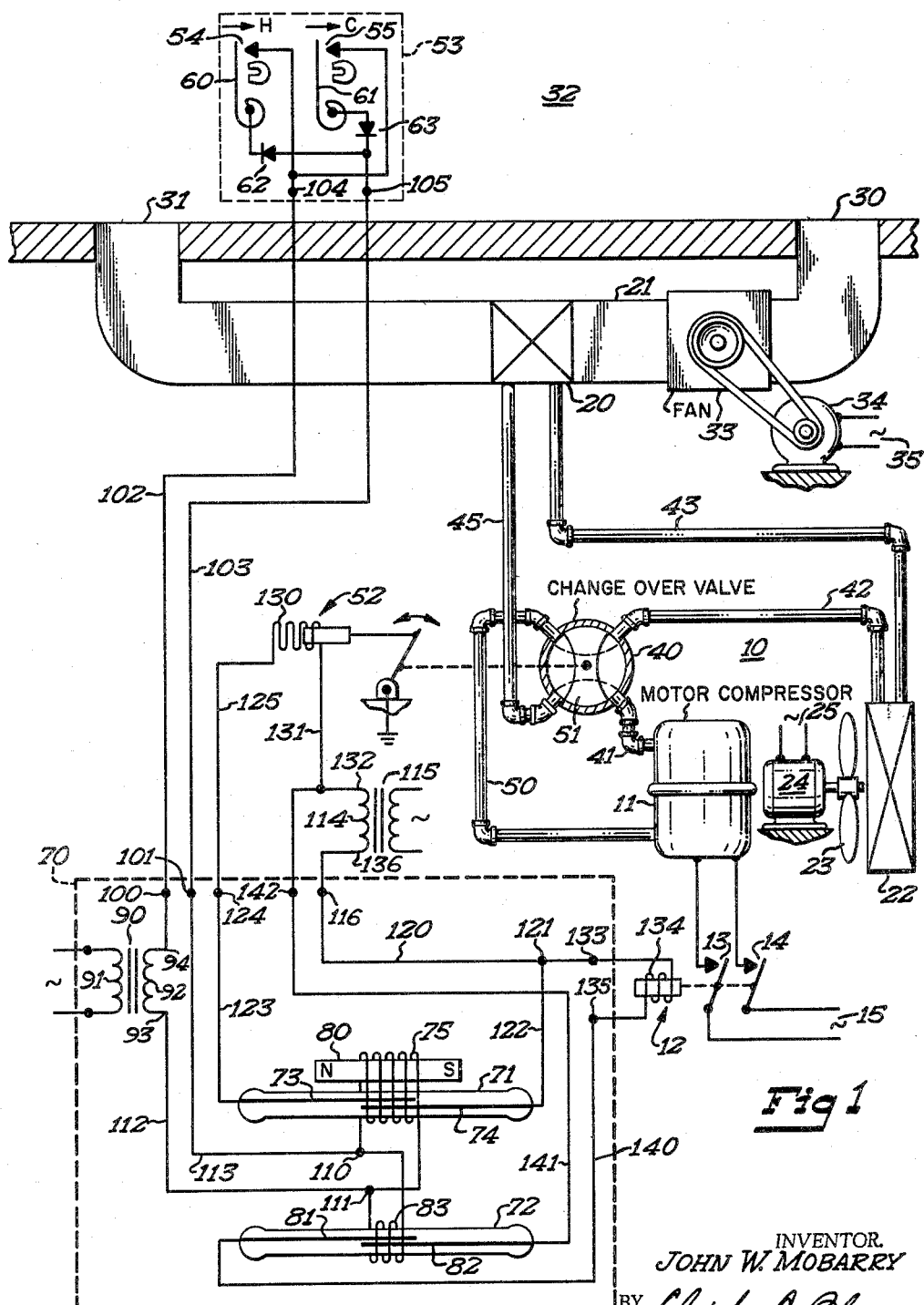

Dec. 24, 1963   J. W. MOBARRY   3,115,018
CONTROL APPARATUS FOR AIR CONDITIONING SYSTEM
Filed April 16, 1962   2 Sheets-Sheet 1

INVENTOR.
JOHN W. MOBARRY
BY Clyde C. Blinn
ATTORNEY

United States Patent Office 3,115,018
Patented Dec. 24, 1963

3,115,018
CONTROL APPARATUS FOR AIR CONDITIONING SYSTEM
John W. Mobarry, Minneapolis, Minn., assignor to Minneapolis-Honeywell Regulator Company, Minneapolis, Minn., a corporation of Delaware
Filed Apr. 16, 1962, Ser. No. 187,891
6 Claims. (Cl. 62—160)

The present invention is concerned with an improved air conditioning system; in particular, a reversible refrigeration system has a control circuit for operating the changeover valve and the motor compressor in which the relays are operated by a unidirectional current of one direction or the other depending upon the need for heating or cooling as sensed by a space thermostat. Upon a need for heating, a relay is operated to remain in one position to hold a changeover valve in a position for heating until a current of the opposite direction is received to operate the valve in another direction.

With the advent of residential air conditioning, the development of control systems to satisfy the highly competitive market has resulted in a highly developed field of activity. One of the conditions which must be met is versatility of application for the many types of systems used in air conditioning. When a system can be adapted for use with many different types of air conditioning apparatuses and the system has a relatively low cost, such factors are found to greatly increase the potential use of such a system.

In the present invention, a panel is provided for controlling a reversible type refrigeration apparatus for use in a heating and cooling installation. The panel contains relays for energization of the changeover valve and the motor compressor in response to a call for heating or cooling from a space thermostat. The thermostat is connected to control the direction of flow of the current to the relays of the panel so the number of wires that are needed to connect the panel and thermostat are maintained at a minimum. When current flows in one direction for a call for cooling, the motor compressor is energized and the changeover valve is held in one position, and when the current flows in the other direction, the changeover valve is initially moved to the cooling position and the motor compressor is controlled in response to the need for cooling.

An object of the present invention is to provide an improved air conditioning system making use of a unidirectional current in one direction or the other to control the position of a changeover valve in a refrigeration heating and cooling installation.

Another object of the present invention is to provide a control system for controlling a changeover valve of a reversible refrigeration apparatus in response to the direction of flow of current from a space thermostat so the changeover valve only operates upon a change in the direction of the current flow.

Figure 2:
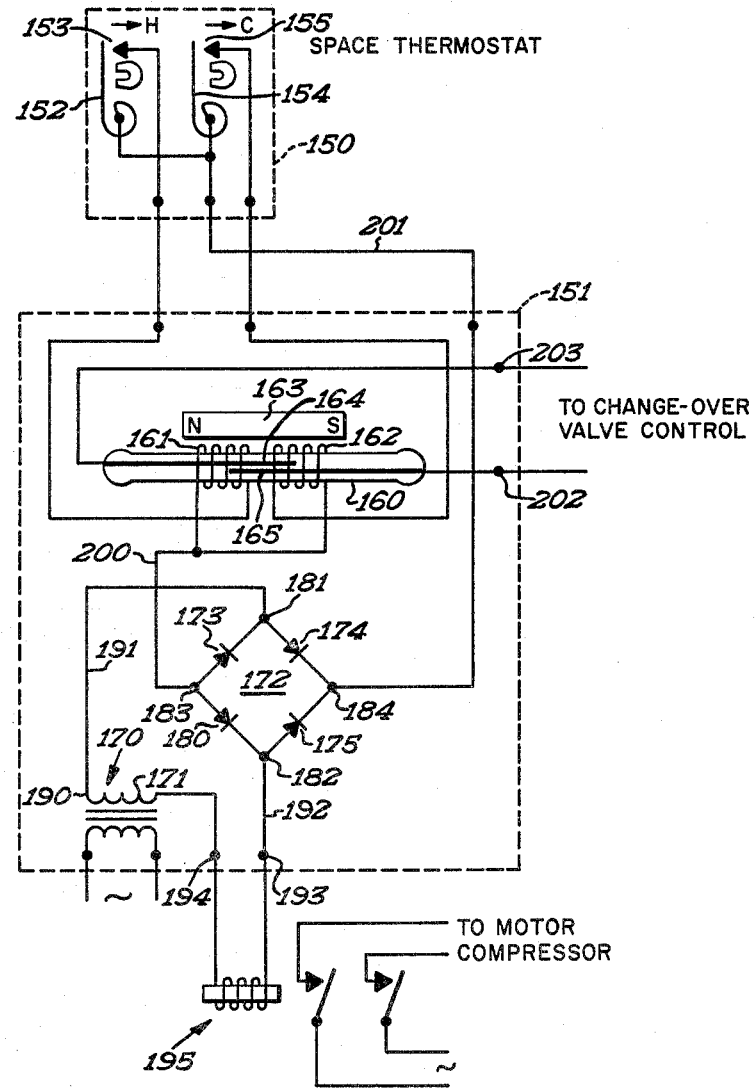

These and other objects of the present invention will become apparent upon the study of the following specification and drawings of which:
FIGURE 1 is a schematic representation of the reversible refrigeration control system.
FIGURE 2 is another embodiment of the control system of FIGURE 1.

Referring to FIGURE 1, a reversible refrigeration control system 10 is shown to have a motor compressor 11 which is energized when a relay 12 is energized to close switches 13 and 14 connecting the motor compressor to a source of power 15. The motor compressor delivers refrigerant to a coil or heat exchanger 20 in duct 21 and a coil or heat exchanger 22. Coil 22 has a fan 23 which is driven by a motor 24 for blowing air through the coil. Motor 24 is connected to a source of power 25. Duct 21 is connected between a return duct 30 and a supply duct 31 for circulating air to a space 32 by a fan 33 which is driven by a constantly energized motor 34 connected to a source of power 35.

Refrigeration system 10 is of a conventional type having a changeover valve 40 to provide either heating or cooling to coil 20 depending upon the direction of the refrigeration flow through the system. As shown, the system supplies heat to coil 22 and removes heat at coil 20 to provide cooling for space 32. The refrigerant flow in the system is traced as follows: from the supply pipe 41 of the motor compressor, valve 40, a pipe 42, coil 22, a pipe 43, coil 20, a pipe 45, valve 40, a pipe 50, and back to the compressor. A movable plug 51 of valve 40 can move to a second position as shown in dotted lines upon the energization of a solenoid 52 to reconnect the refrigeration system so heat is delivered to coil 20 to heat space 32 and taken from the air by coil 22.

A space temperature responsive device or thermostat 53 contains a pair of switches 54 and 55. Switch 54 closes upon a decrease in temperature of an associated bimetal 60. Switch 55 closes upon an increase in the temperature of an associated bimetal 61. A pair of unidirectional current conducting devices or diodes 62 and 63 are connected in series with switches 54 and 55, respectively.

A panel 70 contains two relays 71 and 72. The relays are conventional reed relays of the type shown in the Bascom Patent 2,203,321 wherein a pair of ferromagnetic members are sealed in a glass tube to be affected by a magnetic field produced in close proximity to the members. Relay 71 contains members 73 and 74 and a winding 75. A permanent magnet 80 is positioned to provide a biasing field. When a current flows through winding 75 in one direction, members 73 and 74 are drawn together to close a circuit. Once the members are together, biasing magnet 80 maintains the members in the closed position even though the current in the winding drops to zero. Upon the reversal of the current in the winding, the effect of the biasing magnet 80 is overcome to open the circuit formed by members 73 and 74.

Relay 72 has a pair of members 81 and 82 and a winding 83. When current passes through winding 83 in either direction, members 81 and 82 are moved together to close a circuit.

A conventional source of power is obtained from a transformer 90 having a primary winding 91 connected to an A.C. source. A secondary winding 92 has a pair of terminals 93 and 94.

Panel 70 is connected to thermostat 53 in the following manner: a pair of thermostat terminals 100 and 101 on panel 70 are connected by conductors 102 and 103, respectively to terminals 104 and 105 of the thermostat. Connected to terminals 104 and 105 are two parallel circuits comprising switch 54 and diode 62 and switch 55 and diode 63, respectively. The diodes are so positioned that upon closing one or the other of the switches, the current flow through the two-wire interconnecting circuit is in the opposite direction. Winding 75 of relay 71 is connected in parallel with winding 83 to terminals 110 and 111. Each of the windings are energized by a series circuit comprising the transformer secondary 92 and thermostat 53 by a circuit traced from terminal 111, conductor 112, secondary terminal 93, secondary terminal 94, conductor 102, thermostat 53, conductor 103, conductor 113 and terminal 110.

The switch formed by members 73 and 74 is connected to energize solenoid 52 by a circuit traced as follows: from terminal 136 of a secondary winding 114 of a transformer 115, a terminal 116, a conductor 120, a terminal 121, a conductor 122, the switch of relay 71, a conductor 123, a terminal 124, a conductor 125, a winding 130 of solenoid 52, a conductor 131 and back to a secondary terminal 132 of transformer 115. Relay 12 for controlling the motor compressor is connected to be controlled by relay 72 in the following manner: from secondary terminal 136, conductor 120, a terminal 133, a winding 134, a terminal 135, conductor 140, the switch of relay 72, a conductor 141, terminal 142 and back to the secondary winding terminal 132.

Referring to FIGURE 2, another embodiment of the present invention is shown to have a space thermostat 150 which is connected to a panel 151. Thermostat 150 has a bimetal 152 which closes an associated switch 153 when the temperature of the bimetal decreases below a predetermined temperature. A second bimetal 154 closes a switch 155 when the temperature of the bimetal increases above some predetermined value.

Panel 151 contains a relay 160 which is of the conventional type previously mentioned in connection with relays 71 and 72. Relay 160 has a pair of windings 161 and 162 and a bias magnet 163. The output of windings 161 and 162 as well as the bias magnet affects the operation of the switch made up of members 164 and 165. A source of power 170 comprises a transformer having a secondary 171. A conventional full wave rectifying bridge 172 comprises four rectifiers 173, 174, 175 and 180 connected in a manner so that upon the application of an A.C. voltage to opposite terminals 181 and 182 of the bridge, a D.C. voltage is obtained between terminals 183 and 184. A secondary 171 is connected to terminals 181 and 182 through a circuit traced as follows: from one terminal 190 of the secondary winding, a conductor 191, terminal 181, through the bridge 172, terminal 182, conductor 192, terminal 193, terminal 194, and back to the secondary winding 171. Connected between terminals 193 and 194 is a controller or relay 195 for controlling the refrigeration apparatus similar to relay 12 as shown in FIGURE 1.

Relay 160 is connected to thermostat 150 in the following manner: from terminal 183 of the bridge, a conductor 200, a circuit comprising winding 161 and switch 153 and winding 162 and switch 155 which are connected in parallel, a conductor 201, and back to the other terminal 184 of the bridge.

Relay 160 has a switch connected to terminals 202 and 203 of panel 51 to be adapted to be connected to a change-over valve controlled in the manner as shown in the apparatus of FIGURE 1.

*Operation*

With power supplied at source 15 and 35 as well as to the primary winding of transformer 90 and 115, the control system of FIGURE 1 is ready for operation. Upon a call for heat in space 32 by a drop in the temperature of bimetal 60, switch 54 is closed to supply a unidirectional current to each of the relays 71 and 72. Since the current is in a definite direction depending upon the direction of the conductivity of diode 62, relay 71 will close the circuit between members 73 and 74. Solenoid 52 is energized to operate the changeover valve 40 to make coil 20 a condenser coil and supply heat to the air passing through duct 21. The energization of relay 72 simultaneously with relay 71 brings about the energization of relay 12 to energize the motor compressor.

When the space temperature is satisfied and switch 54 opens, relay 72 is de-energized to open the circuit previously established by members 81 and 82 to de-energize the motor compressor. The loss of current through winding 75 of relay 71 does not result in members 73 and 74 parting as the bias magnet 80 maintains the members closed. Upon a subsequent call for heating by switch 54 closing, the changeover valve will already be in a positoin for heating; therefore, other calls for heat by switch 54 only controls the operation of relay 72.

Thermostat 53 has automatic changeover from heating to cooling so that upon an increase in the space temperature 32 above some predetermined value, switch 55 will close as bimetal 61 increases in temperature above some predetermined value. An energization circuit for relays 71 and 72 is then provided through switch 55, but the direction of current flow is opposite to that provided when switch 54 closed. When switch 55 closes, relay 72 is energized in the same manner as before to bring about the energization of relay 12 and the operation of motor compressor 11. Upon transferring to the cooling operation, relay 71 was in a position to have a circuit established through members 73 and 74. Upon winding 75 receiving a current flow in the opposite direction, a magnetic field established by winding 75 overcomes the effect of magnet 80 on the members 73 and 74 to part the members and open the circuit so the changeover valve moves to the position as shown. As shown, the refrogeration apparatus uses coil 22 as the condenser and heat is removed from the coil 20 to cool the air in duct 21. Upon a satisfaction in the space temperature by the cool air flowing from duct 31, switch 55 opens to de-energize relay 72 and stop the motor compressor. When relay 71 is de-energized, the magnet 80 alone cannot return members 73 and 74 to a closed position so solenoid 52 remains de-energized. Throughout the operation of the cooling part of the system, the cycling of the cooling thermostat switch 55 has no effect upon relay 71 and the changeover valve does not move from the position shown.

With the use of the reed switches and polarized member 80, a panel such as 70 can be used with a two-wire thermostat for both heating and cooling. In the conventional systems used today, at least three wires are needed to provide heating and cooling operation. The panel 70 provides for connection to a conventional system and yet the use of a two-wire thermostat such as 53. Such is accomplished by the novel circuit using the oppositely faced diodes 62 and 63 to select the type of current used in the operation of panel 70 for either heating or cooling.

The control system of FIGURE 2 when connected to a refrigeration apparatus of the type shown in FIGURE 1 operates in the following manner: with a source of A.C. power connected to the primary winding of transformer 170, a D.C. source of power is obtained from bridge 172. Upon a call for cooling by an increase in the space temperature to close switch 154, winding 162 is energized to produce a flux which will oppose the flux of the bias magnet 163. The switch formed by members 164 and 165 then opens to de-energize the changeover valve which is connected to terminals 202 and 203. At the same time that switch 154 closes, controller or relay 195 is energized to bring about the energization of the motor compressor. Upon a subsequent satisfaction in the space temperature to open switch 154, relay 195 is de-energized, but there is no change in the operation of the changeover valve as was also the case in the operation of the system of FIGURE 1. Upon a subsequent need for cooling, switch 154 can bring about the energization of relay 195.

When the space temperature decreases below some predetermined value to close switch 153 to initiate the heating operation, winding 161 is energized to produce a flux which is added to the flux of the bias magnet 163. The sum of the two magnetic fluxes results in the closure of members 164 and 165 to energize the changeover valve control. Simultaneously, as was the case in the cooling operation, relay 195 will be energized. Upon a satisfaction in the space temperature to open switch 153, the remanent flux from bias magnet 163 keeps relay 160 closed to prevent the de-energization of the changeover valve even through relay 195 is de-energized to stop the motor compressor.

The thermostat 150 and the panel of 151 as shown in FIGURE 2 are classed to be add-on components. When a conventional relay 195 and a changeover valve control is used, panel 151 with the thermostat 150 can be used as a package to be easily added on to make a heating-cooling automatic changeover system. The design of the panel is such to provide for a very compact unit requiring very little space which is quite important in present refrigeration apparatus enclosures.

While the invention has been described in one specific manner, the intention is to limit the scope of the invention only by the appended claims in which I claim:

1. In an air conditioning system having a reversible heat pump refrigeration apparatus with a changeover valve to operate in two positions for obtaining heating or cooling, a reed relay means having a switch, one energization winding and magnetic bias means, said switch closing upon receiving a unidirectional current in one direction and being held closed by said bias means until a current of an opposite direction is received to open said switch whereby said relay is only operated upon a change in direction of said current, second reed relay means having a second switch and an energization winding for closing said second switch when a unidirectional current in either direction is received by said energization winding of said second relay means, a source of A.C. power, a space thermostat having a first temperature responsive switch means for closing a circuit upon a need for heating and a second temperature responsive switch means for closing a circuit upon a need for cooling, a first and a second unidirectional current conducting devices, said first relay means being adapted to control the changeover valve to select either heating or cooling operation of the apparatus, said second relay means being adapted to control the refrigeration apparatus, circuit means connecting said energization windings of said first and second relay means in parallel to said source through a parallel circuit of one of said unidirectional devices and said first responsive switch means to supply current in one direction and other of said unidirectional devices and said second responsive switch means to supply current in an opposite direction whereby upon the initial call for heating both relays are energized but subsequent call for heating only operates said second relay means as said bias means maintains the changeover valve in one position.

2. In an air conditioning system having a reversible heat pump refrigeration apparatus with a changeover valve to operate in two positions for obtaining heating or cooling, a reed relay means having a switch, one energization winding and magnetic bias means, said switch closing upon receiving a unidirectional current in one direction and being held closed by said bias means until a current of an opposite direction is received to open said switch whereby said relay is only operated upon a change in direction of said current, a source of A.C. power, a space thermostat having a first temperature responsive switch means for closing a circuit upon a need for heating and a second temperature responsive switch means for closing a circuit upon a need for cooling, said thermostat being adapted to control the refrigeration apparatus, a first and a second unidirectional current conducting devices, said first relay means being adapted to control the changeover valve to select either heating or cooling operation of the apparatus, circuit means connecting said energization winding of said first relay means to said source through a parallel circuit of one of said unidirectional devices and said first responsive switch means to supply current in one direction and other of said unidirectional devices and said second responsive switch means to supply current at an opposite direction whereby upon the initial call for heating said relay is energized.

3. In an air conditioning system having a refrigeration apparatus for removing or supplying heat to a coil depending upon the position of a valve, relay means having a switch and an energization winding, said switch being operated to a closed or open position when a unidirectional current in one or the other direction flows through said winding, bias means for said relay means for maintaining said switch operated in one of said positions upon receiving current at various times in the same direction, said switch means being operated only when the direction of said current changes, space temperature responsive means, said responsive means being adapted to energize the refrigeration apparatus, said responsive means providing a current in one direction upon a need for heating and a current in another direction upon a need for cooling, and circuit means connecting said responsive means to said energization winding.

4. In an air conditioning system, temperature responsive means providing for unidirectional current flow in one direction upon a call for heating and a unidirectional current flow in an opposite direction upon a call for cooling, temperature condition changing apparatus for providing for heating or cooling of a space in which said responsive means is located, relay means responsive to a current in one direction for energizing said changing apparatus for cooling and to a current of another direction for energizing said changing apparatus for heating, and circuit means connecting said temperature responsive means to said relay means.

5. In an air conditioning system having a reversible heat pump refrigeration apparatus with a changeover valve to operate in two positions for obtaining either heating or cooling, a reed relay having two energization windings and a magnetic bias means, a source of D.C. power, a space thermostat for closing a first circuit upon a need for cooling in the space and for closing a second circuit upon a need for heating in the space, circuit means including said first circuit for connecting said source to said first winding, second circuit means for connecting said source to said secondary winding, said bias magnet assisting an output of said first winding to close said reed relay and opposing an output of said second winding to open said reed relay, means adapted to connect a controller for said refrigeration apparatus to said source to be energized when either of said first or second circuits are closed, and means adapted to connect the changeover valve to be controlled by said reed relay.

6. In an air conditioning control system having a reversible refrigeration system, a reed relay having two energization windings, said relay being actuated in a first manner when a current flows in a first of said circuit energization windings and being actuated in a second manner when a current flows in a second of said energization windings, magnetic bias means associated with said reed relay to maintain said relay in said first manner upon the de-energization of said first winding when said second winding is not energized, said relay being adapted to control the reversal of said refrigeration system, a source of power, a space thermostat, and means including said thermostat to connect said source to said first winding upon a call for heating and to said second winding upon a call for cooling.

References Cited in the file of this patent
UNITED STATES PATENTS

| | | |
|---|---|---|
| 2,182,691 | Crago | Dec. 5, 1939 |
| 2,922,284 | Danielson | Jan. 26, 1960 |
| 2,959,925 | Frantti | Nov. 15, 1960 |